United States Patent
Zhao et al.

(10) Patent No.: US 10,659,361 B2
(45) Date of Patent: May 19, 2020

(54) PACKET PROCESSING

(71) Applicant: New H3C Technologies Co., Ltd, Hangzhou (CN)

(72) Inventors: Yunfeng Zhao, Beijing (CN); Jia Li, Beijing (CN)

(73) Assignee: New H3C Technologies Co., Ltd, Hangzhou (CN)

( * ) Notice: Subject to any disclaimer, the term of this patent is extended or adjusted under 35 U.S.C. 154(b) by 186 days.

(21) Appl. No.: 15/756,523

(22) PCT Filed: Sep. 9, 2016

(86) PCT No.: PCT/CN2016/098523
§ 371 (c)(1),
(2) Date: Feb. 28, 2018

(87) PCT Pub. No.: WO2017/041737
PCT Pub. Date: Mar. 16, 2017

(65) Prior Publication Data
US 2018/0270152 A1    Sep. 20, 2018

(30) Foreign Application Priority Data

Sep. 11, 2015 (CN) .......................... 2015 1 0575456

(51) Int. Cl.
*H04L 12/743* (2013.01)
*H04L 12/24* (2006.01)
(Continued)

(52) U.S. Cl.
CPC .......... *H04L 45/7453* (2013.01); *H04L 41/08* (2013.01); *H04L 61/2007* (2013.01); *H04L 69/324* (2013.01); *H04L 69/325* (2013.01)

(58) Field of Classification Search
CPC ... H04L 45/745; H04L 45/7453; H04L 41/08; H04L 61/2007; H04L 69/322–324
See application file for complete search history.

(56) References Cited

U.S. PATENT DOCUMENTS 7,324,514 B1 * 1/2008 Haq .................. H04L 12/66
370/392
7,474,653 B2   1/2009 Herriott et al.
(Continued)

FOREIGN PATENT DOCUMENTS

CN   101247337   8/2008
CN   102025643   4/2011
(Continued)

OTHER PUBLICATIONS

European Search Report issued in corresponding European Patent Application No. 16843675.6, dated Oct. 10, 2018.
(Continued)

*Primary Examiner* — Paul H Masur
(74) *Attorney, Agent, or Firm* — Norton Rose Fulbright US LLP

(57) ABSTRACT

After receiving the packet, an operation type of an operation to be performed for a packet is identified, a key value is extracted from the packet and Hash calculation is performed for the extracted key value; a calculation result of the Hash calculation is taken as a Hash entrance, and at least one Hash index table entry is found from a local Hash index table; match operation is performed between the identified operation type and the at least one Hash index table entry; the packet is processed according to a matched Hash index table entry if the matched Hash index table entry is found.

14 Claims, 5 Drawing Sheets

(51) Int. Cl.
   *H04L 29/12*    (2006.01)
   *H04L 29/08*    (2006.01)

(56)       References Cited

U.S. PATENT DOCUMENTS

| | | | |
|---|---|---|---|
| 2005/0125424 | A1 | 6/2005 | Herriott et al. |
| 2011/0252228 | A1* | 10/2011 | Chang .................. H04L 9/0844 713/153 |
| 2012/0158729 | A1* | 6/2012 | Mital .................... G06F 15/167 707/738 |
| 2014/0089498 | A1* | 3/2014 | Goldfarb ............. H04L 63/0263 709/224 |
| 2014/0282830 | A1 | 9/2014 | Davis et al. |
| 2015/0039627 | A1* | 2/2015 | Sen ..................... G06F 16/2255 707/747 |
| 2017/0054591 | A1* | 2/2017 | Hyoudou ............ H04L 41/0686 |
| 2018/0107759 | A1* | 4/2018 | Cheng ................... G06F 16/00 |

FOREIGN PATENT DOCUMENTS

| | | |
|---|---|---|
| CN | 102882810 | 1/2013 |
| CN | 103595637 A | 2/2014 |
| JP | 2009296131 A | 12/2009 |
| WO | WO2014101777 | 7/2014 |

OTHER PUBLICATIONS

International Search Report and Written Opinion issued in International Application No. PCT/CN2016/098523, dated Nov. 30, 2016.
Office Action issued in corresponding Chinese Patent Application No. 201510575456.5, dated Dec. 24, 2018.
Notice of Grant issued in corresponding Japanese Patent Application No. 2018512600, dated Feb. 19, 2019 (English machine translation).

* cited by examiner

PACKET PROCESSING

CROSS-REFERENCE TO RELATED APPLICATIONS

This application is a national phase under 35 U.S.C. § 371 of International Application No. PCT/CN2016/098523, filed Sep. 9, 2016, which claims the benefit of priority to Chinese Patent Application No. 201510575456.5, filed Sep. 11, 2015. The contents of each of the above-referenced applications are incorporated into the present application by reference.

BACKGROUND

When processing packets, network devices need to perform various types of operations on the packets according to information, e.g. configuration information of interfaces or packet types, so as to implement forwarding of packets, processing of services, such as, Layer 2 forwarding, Layer 3 forwarding, unicast forwarding, multicast forwarding, and Access Control List (ACL) match service processing and etc. Generally, for a same packet, different types of operations are mutually exclusive. For instance, if Layer 2 forwarding is performed for a packet, Layer 3 forwarding will not be performed for the packet in most cases. If unicast forwarding is performed for a packet, multicast forwarding will not be performed for the packet in most cases.

DETAILED DESCRIPTION

Figure 1:
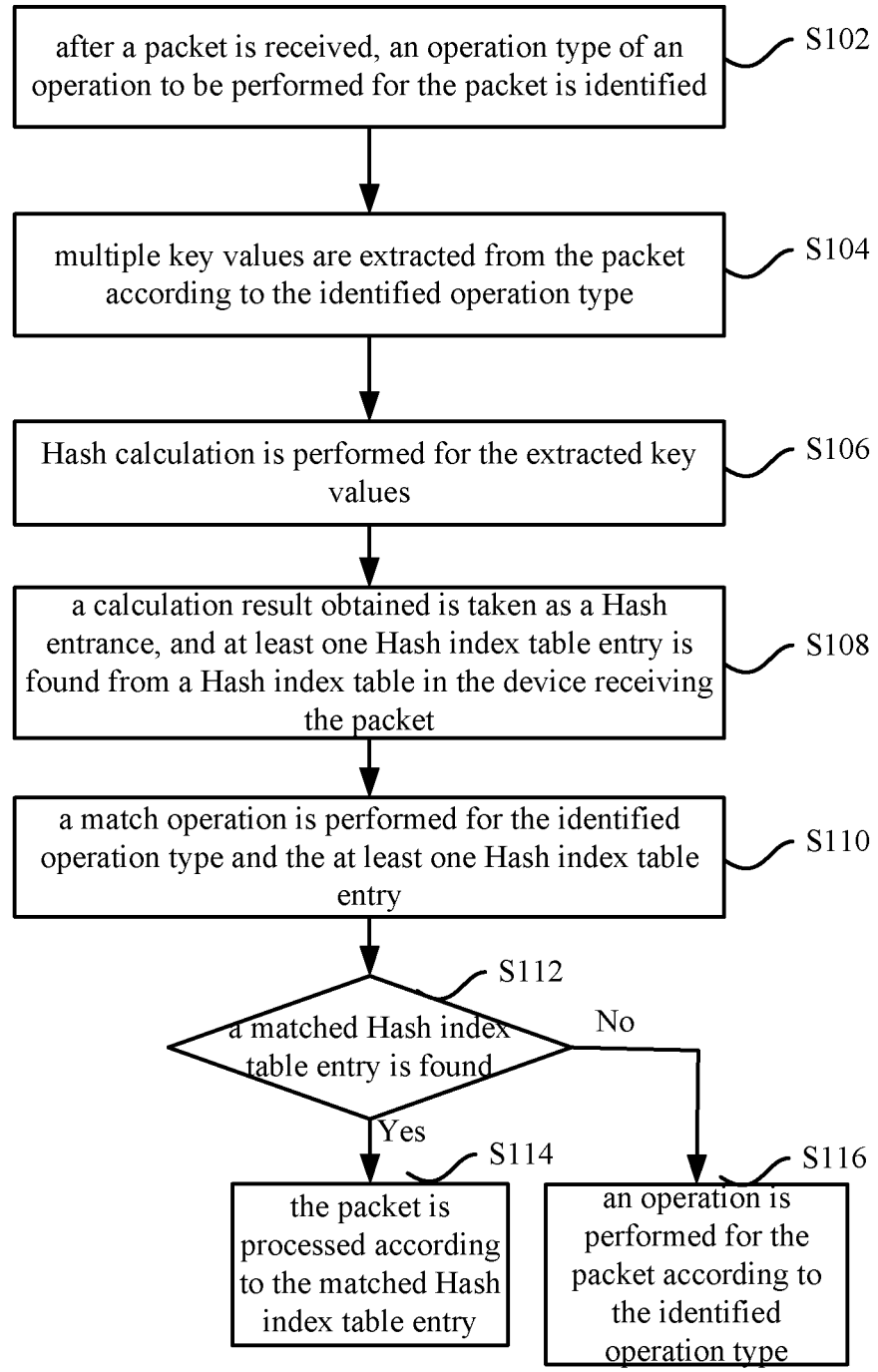
FIG. 1 is a flowchart illustrating a packet processing method according to various examples of the present disclosure.

Examples of the present disclosure provide a packet processing method and a packet processing apparatus for applying the packet processing method.

The following examples of the present disclosure may be applied to network devices which process packets by using a Hash search mode.

Hash index tables are introduced in the examples of the present disclosure to facilitate description. There are two types of Hash index tables. In one type of Hash index table, the Hash index table is a Hash table including a valid identifier, an operation type and a processing mode. The structure of the Hash table is shown in table 1.

TABLE 1

| Valid | Type | Processing information |
|---|---|---|

As shown in table 1, Valid represents the valid identifier for indicating whether a Hash table entry corresponding to the valid identifier is valid.

Type represents the operation type which may be Layer 2 forwarding, Layer 3 Internet Protocol Version 4 (IPv4) forwarding, Layer 3 Internet Protocol Version 6 (IPv6) forwarding, multicast forwarding, ACL match service and etc.

The processing information is the processing mode for a packet matching with the Hash table entry. The processing mode may include sending the packet to a control plane to establish a Hash table entry, sending the packet to the control plane to perform ARP learning, discarding the packet and etc. In this type, the processing mode to be performed for the packet may be directly stored in the Hash table entry of the Hash table.

In the other type of Hash index table, the Hash index table includes a Hash table and a result table. The Hash table at least includes a valid identifier and a result table pointer. The Hash table may further include an operation type, as shown in tables 2 or 3.

TABLE 2

| Valid | Processing information |
|---|---|

TABLE 3

| Valid | Type | Processing information |
|---|---|---|

As shown in tables 2 and 3, Valid represents the valid identifier for indicating whether a Hash table entry corresponding to the valid identifier is valid.

Type represents the operation type which may be Layer 2 forwarding, Layer 3 IPv4 forwarding, Layer 3 IPv6 forwarding, multicast forwarding, ACL match service and etc.

The processing information is the result table pointer, and a Hash table entry in the Hash table is mapped to a result table entry in the result table via the result table pointer. The result table pointer may be mapped to one or more result table entries. The result table is shown in table 4.

TABLE 4

| Valid | Type | Processing mode |
|---|---|---|

In table 4, the meanings of Valid and Type are the same as those in the Hash table.

The processing mode in table 4 is the processing mode for a packet matching with the result table entry. For example, the processing mode may include sending the packet to a control plane to establish a Hash table entry, discarding the packet and etc.

When the processing mode has less contents such that the Hash table is enough to store the contents of the processing mode, the result table may be not used. When the processing mode has more contents such that the Hash table cannot store all of the contents, the Hash table and the result table may be used, wherein the processing mode is stored in the result table, and the mapping between the Hash table and the result table is established via the result table pointer.

In examples of the present disclosure, at least one of the Hash table and the result table may include a field of Key. The Key represents a key value, and different Types may correspond to different Keys. For example, when the Type is the Layer 2 forwarding, the Key may include a destination Medium Access Control (MAC) address, a source MAC address, a Virtual Private Network (VPN) Identity (ID). When the Type is the Layer 3 IPv4 forwarding, the Key may include a destination Internet Protocol (IP) address, a source IP address and a VPN ID. When the Type is the Layer 3 IPv6 forwarding, the Key may include a destination IP address, a source IP address, a VPN ID, and a Layer 3 protocol number. When the Type is multicast forwarding, the Key may include a destination IP address, a source IP address, a VPN ID, and a destination port number. When the Type is the ACL match service, the Key may include all key values necessary for the ACL match. These are examples of Keys to be extracted for different Types, which is not used to limit the present disclosure.

The fields of Type and Key may be used to solve Hash conflict. It is supposed that the Hash index table stores multiple Hash index table entries. When a calculation result obtained by performing Hash calculation for a key value extracted from a packet is "a", and a calculation result by performing the Hash calculation for a key value extracted from another packet is also "a", a Hash conflict occurs. The Hash index table entries generated according to the two packets may be both stored in memory space having a Hash entrance of "a". According to the fields of Type and Key, the packet matching with the Hash index table entry may be determined.

In addition, in case that the Hash index table is the Hash table and is a linked list, when a calculation result obtained by performing the Hash calculation for a key value extracted from a packet is "a" which corresponds to multiple Hash table entries, a Hash conflict occurs. According to the fields of Type and Key, a matched Hash table entry may be found from multiple Hash index entries.

When the Hash index table includes the Hash table and the result table, the process is similar with the above-mentioned process, and the difference is that the result table is searched according to the result table pointer in a matched Hash table entry to obtain a processing mode when the matched Hash table entry is found from the Hash table, which will not be described in detail.

Moreover, the configuration of the Hash index table is relatively flexible, and locations of the fields of Type and Key may be adjusted according to different requirements when the Hash index table is configured. For example, the field of Type may be included in the Hash table and the field of Key may be included in the result table; the field of Type may be included in both the Hash table and the result table, and the field of Key may be included in the Hash table; or the fields of Type and Key may be included in the Hash table, and the result table may not include the fields of Type and Key; or the like.

FIG. 1 is a flowchart illustrating a packet processing method according to various examples of the present disclosure. As shown in FIG. 1, the packet processing method includes the following blocks.

At block S102, after a packet is received, an operation type of an operation to be performed for the packet is identified.

Generally, related configuration information of an ingress interface of the packet may be obtained from an interface table, and the operation type (Type) of the operation to be performed for packet may be identified according to the obtained configuration information and parsed contents related to the packet. For example, the operation type may be Layer 2 forwarding, Layer 3 IPv4 forwarding, Layer 3 IPv6 forwarding, multicast forwarding, ACL match service and etc. In at least one of the Hash table and the result table, types corresponding to values of the Type may be preconfigured by users. For example, the value of the Type corresponding to the Layer 2 forwarding may be 01, and the value of the Type corresponding to the Layer 3 IPv4 forwarding may be 02.

The ACL match service is taken as an example. When a certain interface is configured with at least one ACL rule, the at least one ACL rule is divided into at least one ACL match service subclass according to preconfigured dividing rules. For example, the at least one ACL match service subclass may be a Layer 2 ACL match service subclass, a Layer 3 IPv4 ACL match service subclass and a Layer 3 IPv6 ACL match service subclass. The corresponding relationship between the interface and the at least one ACL match service subclass is then configured in the interface table. At block S102, after the packet is received, at least one ACL match service subclass corresponding to the ingress interface of the packet is found from the interface table, and an ACL match service subclass matching with the packet may be determined, among the at least one ACL match service subclass, as the operation type of the operation to be performed for the packet. For example, if the packet is a Layer 2 packet, the ACL match service subclass matching with the packet may be determined as the Layer 2 ACL match service subclass. If the packet is a Layer 3 packet and the packet is an IPv4 packet, the ACL match service subclass matching with the packet may be determined as the Layer 3 IPv4 ACL match service subclass. If the packet is a Layer 3 packet and the packet is an IPv6 packet, the ACL match service subclass matching with the packet may be determined as the Layer 3 IPv6 ACL match service subclass.

At block S104, multiple key values (Keys) are extracted from the packet according to the identified operation type.

In some examples, when the operation type is Layer 2 forwarding, a destination MAC address, a source MAC address and a VPN ID are extracted from the packet.

When the operation type is Layer 3 IPv4 forwarding, a destination IP address, a source IP address and a VPN ID are extracted from the packet.

When the operation type is Layer 3 IPv6 forwarding, a destination IP address, a source IP address, a VPN ID and a Layer 3 protocol number are extracted from the packet.

When the operation type is multicast forwarding, a destination IP address, a source IP address, a VPN ID and a destination port number are extracted from the packet.

When the operation type is the ACL match service, key values required for the ACL match are extracted.

The above are examples of key values extracted for different operation types, and are not used to limit the present disclosure.

At block S106, Hash calculation is performed for the extracted key values.

In some examples, the Hash calculation is performed for the extracted key values according to a specific algorithm, e.g. an XOR algorithm, a Cyclic Redundancy Check (CRC) algorithm and etc.

At block S108, a calculation result obtained at block S106 is taken as a Hash entrance, and at least one Hash index table entry is found from a Hash index table in the device receiving the packet.

The same Hash entrance may correspond to one or more Hash index table entries because of possible Hash conflicts.

In some examples of the present disclosure, at least one Hash table entry is found at block S108. When the Hash index table is the Hash table, the found Hash table entry includes the processing mode; when the Hash index table includes the Hash table and the result table, and at least one of the Hash table and the result table includes the Type, the found Hash table entry includes the result table pointer.

At block S110, a match operation is performed for the identified operation type and the at least one Hash index table entry.

In some examples, the match operation may be performed for the operation type and the key values respectively.

At block S112, it is determined whether a matched Hash index table entry is found. The matched Hash index table entry is a Hash index table entry matched with identified operation type. If the matched Hash index table entry is found, processing at block S114 is preformed, and if no matched Hash index table entry is found, processing at block S116 is performed.

At block S114, the packet is processed according to the matched Hash index table entry.

In some examples of the present disclosure, when the Hash index table is the Hash table including the field of Type as shown in table 1, the match operation may be performed between the identified operation type and the at least one found Hash table entry, at block S110. At block S114, if a matched Hash table entry is found, the packet is processed according to a processing mode included in the matched Hash table entry.

In some examples of the present disclosure, when the Hash index table includes the Hash table and the result table, the Hash table does not include the field of Type as shown in table 2, and the result table includes the field of Type as shown in table 4, a result table is found according to a result table pointer included in each found Hash table entry, and the match operation may be performed between the identified operation type and result table entries in the found result table, at block S110. At block S114, if a matched result table entry is found, the packet is processed according to a processing mode included in the matched result table entry.

In some examples of the present disclosure, when the Hash index table includes the Hash table and the result table, the Hash table includes the field of Type as shown in table 3, and the result table includes the field of Type as shown in table 4, at block S110, the match operation may be performed between the identified operation type and the at least one found Hash table entry. If a matched Hash table entry is found, a result table is found according to a result table pointer included in the matched Hash table entry, and the match operation may be performed between the identified operation type and the result table entries in the found result table. At block S114, if a matched result table entry is found, the packet is processed according to a processing mode included in the matched result table entry.

At block S116, an operation is performed for the packet according to the identified operation type. For example, the packet may be discarded or sent to the control plane to establish a Hash index table entry according to the packet.

When the packet is processed, a default processing mode may be configured for each operation type. When no matched Hash index table entry is found, the default processing mode is determined according to the identified operation type, and the packet is processed according to the default processing mode. The default processing mode may include, e.g. sending the packet to a control plane to establish a Hash index table entry according to the packet or discarding the packet.

In some examples of the present disclosure, when establishing the Hash index table entry according to the packet at block S116, the following processing may be included. The calculation result obtained by performing the Hash calculation for the key values extracted from the packet is taken as the Hash entrance, and a Hash table entry is added to the Hash table. When the Hash index table is a Hash table as shown in table 1, the added Hash table entry includes the fields of Valid, Type and processing information, and the processing information is configured as a processing mode. When the Hash index table includes a Hash table as shown in table 2 and a result table shown in table 4, the added Hash table entry includes the fields of Valid and processing information, and the processing information is configured as a result table pointer. When the Hash index table includes a Hash table as shown in table 3 and a result table shown in table 4, the added Hash table entry includes the fields of Valid, Type and processing information, and the processing information is configured as a result table pointer.

In the method of the above-mentioned examples of the present disclosure, the operation type, i.e. the field of Type is introduced into the Hash index table, and multiple Hash index tables corresponding to different operation types may be integrated into one Hash index table in which different operation types are distinguished, thereby avoiding that each of the different operation types corresponds to one Hash table. In order to process different data streams, in each Hash table, memory spaces need to be assigned for all data streams which can be processed by the device to store corresponding Hash table entries. Hence, the network device needs to assign enough memory space Sum for each Hash table to store the Hash table entries corresponding to all data streams. The Hash index table provided by the examples of the present disclosure only occupies one memory space Sum, so that different operation types may use the same memory space Sum, and thus the entry space sources are saved. In addition, the operation type is introduced into the Hash index table, thus each Hash index table entry only needs to record the key value corresponding to the operation type, and thus the entry space sources are further saved.

Figure 2:
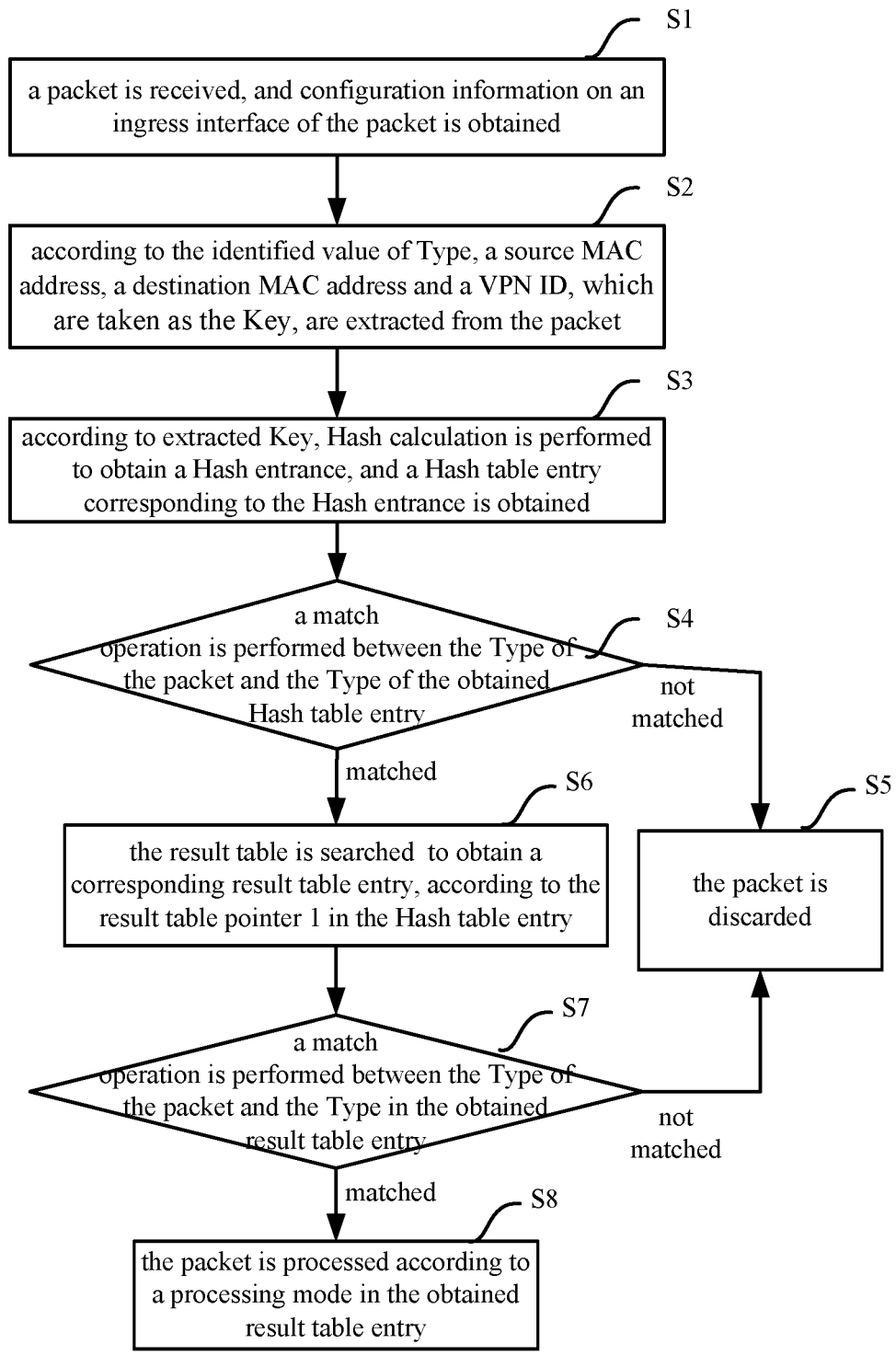
FIG. 2 is a flowchart illustrating a packet processing method according to various examples of the present disclosure.

The packet processing method provided by the examples of the present disclosure will be described by using a detailed example. FIG. 2 is a flowchart illustrating a packet processing method according to various examples of the present disclosure. In the example, a Hash index table includes a Hash table and a result table. In the Hash table, one Hash entrance corresponds to one Hash table entry. The Hash table includes fields of Valid, Type, Key and a result table pointer, and the result table includes fields of Valid, Type and a processing mode.

At block S1, a packet is received, and configuration information on an ingress interface of the packet is obtained. For example, Layer 2 forwarding is configured on the ingress interface, and an identified value of Type corresponding to the Layer 2 forwarding is 01.

At block S2, according to the identified value of Type, a source MAC address, a destination MAC address and a VPN ID, which are taken as the Key, are extracted from the packet.

Figure 3:
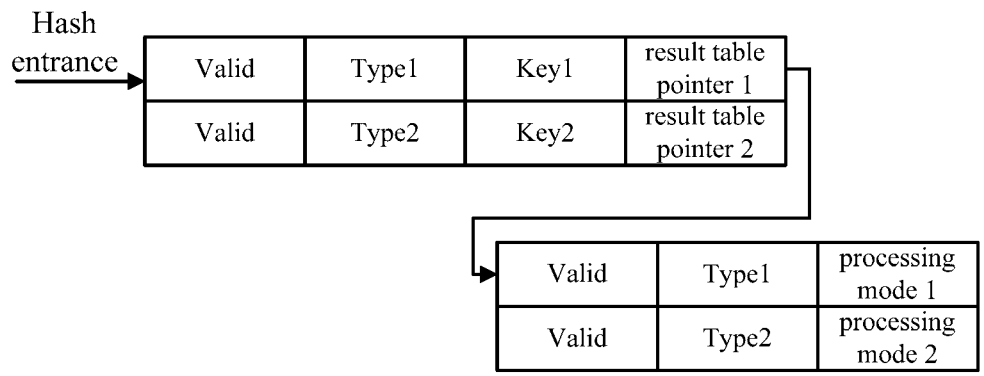
FIG. 3 is a diagram illustrating a Hash table and a result table according to various examples of the present disclosure.

At block S3, according to extracted Key, Hash calculation is performed to obtain a Hash entrance, and a Hash table entry corresponding to the Hash entrance is obtained. In the example, the Hash table and the result table are shown in FIG. 3.

At block S4, a match operation is performed between the Type of the packet and the Type of the obtained Hash table entry. If the Type of the packet is matched with the Type of the obtained Hash table entry, block S6 is performed, and if the Type of the packet is not matched with the Type of the obtained Hash table entry, block S5 is performed.

At block S5, a default processing mode is executed, that is, the packet is discarded.

At block S6, the result table is searched to obtain a corresponding result table entry, according to the result table pointer 1 in the Hash table entry.

At block S7, a match operation is performed between the Type of the packet and the Type in the obtained result table entry. If the Type of the packet is matched with the Type in the obtained result table entry, block S8 is performed, if the Type of the packet is not matched with the Type in the obtained result table entry, block S5 is performed.

At block S8, the packet is processed according to a processing mode in the obtained result table entry. For example, the packet may be sent to the control plane to perform ARP learning.

Thus, the processing for the packet is finished. Based on the operation type of the packet, necessary key values are identified, and the match operation is performed in the Hash index table. It is unnecessary to store numerous key values in the Hash index table or configure different Hash index tables for different operation types. Therefore, the space for storing the table entries in the packet processing apparatus is saved and forwarding performance of the packet processing apparatus is improved.

Examples of the present disclosure provide a packet processing apparatus which may apply the packet processing method. The packet processing apparatus may be applied to network devices which process packets by using a Hash search mode.

Figure 4:
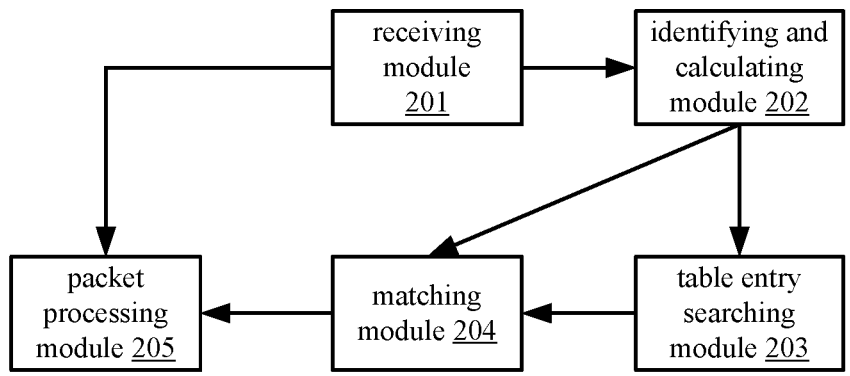
FIG. 4 is a diagram illustrating a structure of a packet processing apparatus according to various examples of the present disclosure.

As shown in FIG. 4, the packet processing apparatus includes a receiving module 201, an identifying and calculating module 202, a table entry searching module 203, a matching module 204 and a packet processing module 205.

The receiving module 201 is to receive a packet.

The identifying and calculating module 202 is to identify an operation type of an operation to be performed for the packet, extract a key value from the packet and perform Hash calculation for the extracted key value.

The table entry searching module 203 is to take a calculation result obtained by the identifying and calculating module 202 as a Hash entrance, and find at least one Hash index table entry from a Hash index table of the packet processing apparatus.

The matching module 204 is to perform a match operation between the operation type identified by the identifying and calculating module 202 and the at least one Hash index table entry found by the table entry searching module 203.

The packet processing module 205 is to process the packet received by the receiving module 201 according to a matched Hash index table entry if the matched Hash index table entry is found by the matching module 204.

In some examples, when the Hash index table is the Hash table, the matching module 204 is to perform the match operation between the operation type identified by the identifying and calculating module 202 and the at least one Hash table entry found by the table entry searching module 203, and the packet processing module 205 is to, if a matched Hash table entry is found by the matching module 204, process the packet received by the receiving module 201 according to a processing mode included in the matched Hash table entry.

When the Hash index table includes a Hash table and a result table, the Hash table does not include a field of Type and the result table includes the field of Type, the matching module 204 may include a searching unit and a result table entry matching unit.

The searching unit is to, for each Hash table entry found by the table entry searching module 203, find a result table according to a result table pointer included in the Hash table entry.

The result table entry matching unit is to perform the match operation between the operation type identified by the identifying and calculating module 202 and result table entries in the result table found by the searching unit.

The packet processing module 205 is to process the packet received by the receiving module 201 according to a processing mode included in a matched result table entry if the matched result table entry is found by the result table entry matching unit.

When the Hash index table includes a Hash table and a result table, and the Hash table and the result table both include a field of Type, the matching module 204 may include a Hash table entry matching unit, a searching unit and a result table entry matching unit.

The Hash table entry matching unit is to perform the match operation between the operation type identified by the identifying and calculating module 202 and at least one Hash table found by the table entry searching module 203.

The searching unit is to find a result table according to a result table pointer included in a matched Hash table entry, if the matched Hash table entry is found by the Hash table entry matching unit.

The result table entry matching unit is to perform the match operation between the operation type identified by the identifying and calculating module 202 and result table entries in the result table found by the searching unit.

The packet processing module 205 is to process the packet received by the receiving module 201 according to a processing mode included in a matched result table entry if the matched result table entry is found by the result table entry matching unit.

Figure 5:
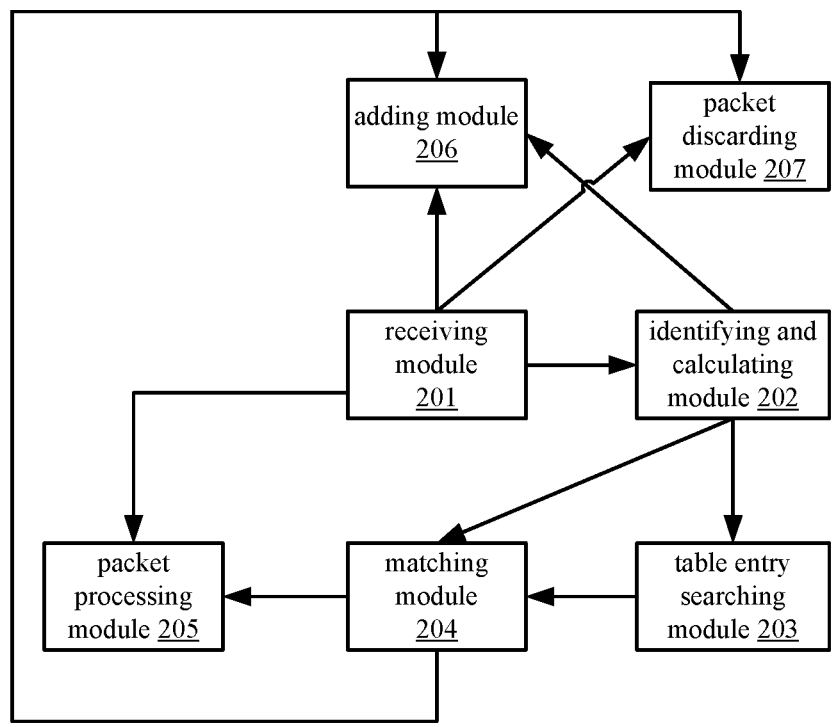
FIG. 5 is a diagram illustrating another structure of a packet processing apparatus according to various examples of the present disclosure.

In the examples of the present disclosure, as shown in FIG. 5, the packet processing apparatus further includes an adding module 206 and a packet discarding module 207.

If no matched Hash index table entry is found by the matching module 204, the adding module 206 is to, when determining it is needed to establish a Hash index table entry according to the packet received by the receiving module 201, add a Hash index table entry including the operation type identified by the identifying and calculating module 202 into the Hash index table by taking the calculation result obtained by the identifying and calculating module 202 as the Hash entrance.

If no matched Hash index table entry is found by the matching module 204, the packet discarding module 207 is to discard the packet when determining it is needed to discard the packet received by the receiving module 201.

Figure 6:
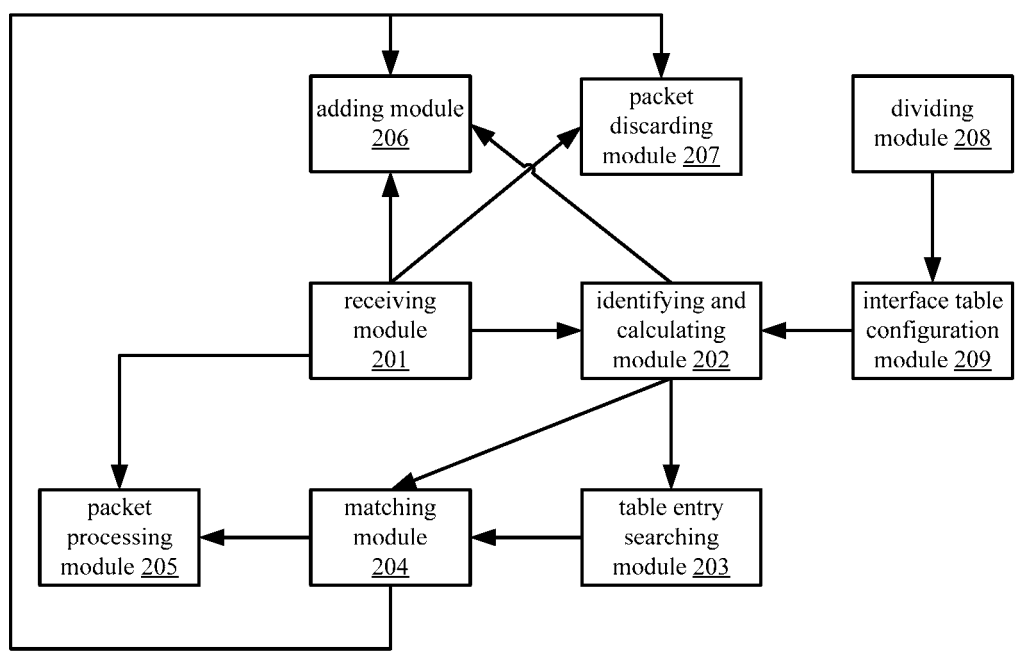
FIG. 6 is a diagram illustrating another structure of a packet processing apparatus according to various examples of the present disclosure.

In the examples of the present disclosure, as shown in FIG. 6, the packet processing apparatus further includes a dividing module 208 and an interface table configuration module 209. The identifying and calculating module 202 includes a subclass searching unit and an operation type determining unit.

The dividing module 208 is to, when an interface is configured with at least one ACL rule, divide the at least one ACL rule into at least one ACL match service subclass according to preconfigured dividing rules.

The interface table configuration module 209 is to configure a corresponding relationship between the interface and the at least one ACL match service subclass divided by the dividing module 208 into the interface table.

The subclass searching unit is to, after the receiving module 201 receives the packet, find at least one ACL match service subclass corresponding to an ingress interface of the packet from the interface table.

The operation type determining unit is to, from the at least one ACL match service subclass found by the subclass searching unit, determine an ACL match service subclass matching with the packet received by the receiving module 201 as an operation type of an operation to be performed for the packet.

In some examples, the at least one ACL match service subclass may include a Layer 2 ACL match service subclass, a Layer 3 IPv4 ACL match service subclass and a Layer 3 IPv6 ACL match service subclass. The operation type determining unit is to:

if the packet received by the receiving module 201 is a Layer 2 packet, determine the ACL match service subclass matching with the packet as the Layer 2 ACL match service subclass;

if the packet received by the receiving module 201 is a Layer 3 packet and the packet is an IPv4 packet, determine the ACL match service subclass matching with the packet as the Layer 3 IPv4 ACL match service subclass;

if the packet received by the receiving module 201 is a Layer 3 packet and the packet is an IPv6 packet, determine the ACL match service subclass matching with the packet as the Layer 3 IPv6 ACL match service subclass.

Figure 7:
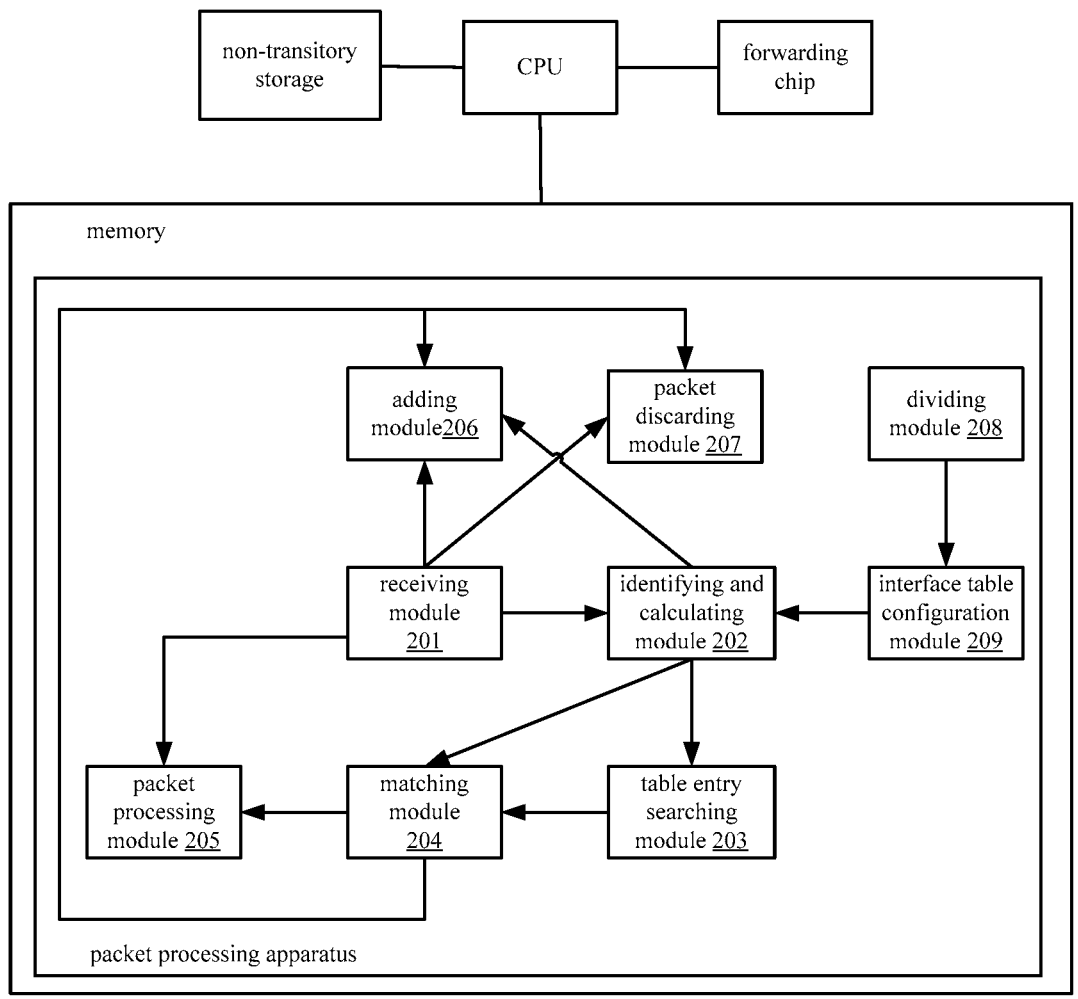
FIG. 7 is a diagram illustrating a hardware structure of a packet processing apparatus according to various examples of the present disclosure.

The packet processing apparatus provided by the examples of the present disclosure may be a programmable device realized by software accompanying with necessary general hardware platforms. FIG. 7 is a diagram illustrating a hardware structure of a packet processing apparatus according to various examples of the present disclosure. As shown in FIG. 7, the packet processing apparatus includes a non-transitory storage, a CPU, a forwarding chip and memory.

The memory is to store instruction codes. The operations implemented when the instruction codes are executed may include functions implemented by the receiving module, the identifying and calculating module, the table entry searching module, the matching module, the packet processing module, the adding module, the packet discarding module, the dividing module and the interface table configuration module, which will not be described in detail herein.

The CPU is to communicate with the forwarding chip, receive and forward packets, and is to communicate with the memory, read and execute the instruction codes stored in the memory to implement the functions of the receiving module, the identifying and calculating module, the table entry searching module, the matching module, the packet processing module, the adding module, the packet discarding module, the dividing module and the interface table configuration module, and process the packets sent by the forwarding chip. The CPU is further to communicate with the non-transitory storage, read/write data including the Hash table, the result table and the interface table in the non-transitory storage.

The forwarding chip is to connect to other network devices via ports of the forwarding chip, receive and forward packets. In some examples, the forwarding chip is to send the packet to the CPU to perform table search.

The non-transitory storage is to store various data including the Hash table, the result tables and the interface table.

According to the above examples of the present disclosure, the operation type, i.e. the field of Type is introduced to the Hash index table, and thus multiple Hash index tables corresponding to different operation types may be integrated into one Hash index table in which different operation types are distinguished, thereby avoiding that each of the different operation types corresponds to one Hash table. In order to process different data streams, in each Hash table, memory spaces need to be assigned for all data streams which can be processed by the device to store corresponding Hash table entries. Hence, the network device needs to assign enough memory space Sum for each Hash table to store the Hash table entries corresponding to all data streams. The Hash index table provided by the examples of the present disclosure only occupies one memory space Sum, so that different operation types may use the same memory space Sum, and thus the entry space sources are saved. In addition, the operation type is introduced into the Hash index table, thus each Hash index table entry only needs to record the key value corresponding to the operation type, and thus the entry space sources are further saved.

The foregoing are some examples of the present disclosure and are not used to limit the protection scope of the present disclosure. Any modification, equivalent substitution and improvement without departing from the spirit and principle of the present disclosure are within the protection scope of the present disclosure.

The invention claimed is:

1. A packet processing method, comprising:
   identifying an operation type of an operation to be performed for a packet by obtaining related configuration information of an ingress interface of the packet from an interface table, after receiving the packet, extracting a key value from the packet and performing Hash calculation for the extracted key value;
   taking a calculation result of the Hash calculation as a Hash entrance, and finding at least one Hash index table entry from a local Hash index table;
   performing a match operation between the identified operation type and the at least one Hash index table entry; and
   processing the packet according to a matched Hash index table entry if the matched Hash index table entry is found.

2. The method of claim 1, wherein the Hash index table is a Hash table;
   performing a match operation between the identified operation type and the at least one Hash index table entry comprises:
      performing the match operation between the identified operation type and at least one Hash table entry;
   processing the packet according to a matched Hash index table entry if the matched Hash index table entry is found comprises:
      processing the packet according to a processing mode comprised in a matched Hash table entry if the matched Hash table entry is found.

3. The method of claim 1, wherein the Hash index table comprises a Hash table and a result table;
   performing a match operation between the identified operation type and the at least one Hash index table entry comprises:
      for each Hash table entry, finding a result table according to a result table pointer comprised in the Hash table entry; and
      performing the match operation between the identified operation type and result table entries in the found result table;

processing the packet according to a matched Hash index table entry if the matched Hash index table entry is found comprises:
  processing the packet according to a processing mode comprised in a matched result table entry if the matched result table entry is found.

4. The method of claim 1, wherein the Hash index table comprises a Hash table and a result table,
  performing a match operation between the identified operation type and the at least one Hash index table entry comprises:
    performing the match operation between the identified operation type and at least one Hash table entry;
    finding a result table according to a result table pointer comprised in a matched Hash table entry, if the matched result table entry is found; and
    performing the match operation between the identified operation type and result table entries in the found result table;
  processing the packet according to a matched Hash index table entry if the matched Hash index table entry is found comprises:
    processing the packet according to a processing mode comprised in a matched result table entry if the matched result table entry is found.

5. The method of claim 1, further comprising:
  after performing a match operation between the identified operation type and the at least one Hash index table entry;
  if no matched Hash index table entry is found,
  when determining it is needed to establish a Hash index table entry according to the packet, adding a Hash index table entry comprising the identified operation type into the Hash index table by taking the calculation result as the Hash entrance;
  when determining it is needed to discard the packet, discarding the packet.

6. The method of claim 1, further comprising:
  when an interface is configured with at least one Access Control List (ACL) rule, dividing the at least one ACL rule into at least one ACL match service subclass according to preconfigured dividing rules; and
  configuring a corresponding relationship between the interface and the at least one ACL match service subclass in an interface table;
  wherein identifying an operation type of an operation to be performed for a packet after receiving the packet comprises:
    after receiving the packet, finding at least one ACL match service subclass corresponding to an ingress interface of the packet from the interface table; and
    determining an ACL match service subclass matching with the packet as the operation type of the operation to be performed for the packet from the at least one found ACL match service subclass.

7. The method of claim 6, wherein the at least one ACL match service subclass comprises a Layer 2 ACL match service subclass, a Layer 3 Internet Protocol Version 4 (IPv4) ACL match service subclass and a Layer 3 Internet Protocol Version 6 (IPv6) ACL match service subclass;
  determining the ACL match service subclass matching with the packet comprises:
    if the packet is a Layer 2 packet, determining the ACL match service subclass matching with the packet as the Layer 2 ACL match service subclass;
    if the packet is a Layer 3 packet and the packet is an IPv4 packet, determining the ACL match service subclass matching with the packet as the Layer 3 IPv4 ACL match service subclass; and
    if the packet is a Layer 3 packet and the packet is an IPv6 packet, determining the ACL match service subclass matching with the packet as the Layer 3 IPv6 ACL match service subclass.

8. A packet processing apparatus, comprising:
  a CPU and a memory;
  wherein the memory is to store instruction codes which are executed by the CPU, so as to cause the CPU to perform operations of:
    identifying an operation type of an operation to be performed for a packet by obtaining related configuration information of an ingress interface of the packet from an interface table, after receiving the packet, extracting a key value from the packet and performing Hash calculation for the extracted key value;
    taking a calculation result of the Hash calculation as a Hash entrance, and finding at least one Hash index table entry from a local Hash index table;
    performing a match operation between the identified operation type and the at least one Hash index table entry; and
    processing the packet according to a matched Hash index table entry if the matched Hash index table entry is found.

9. The packet processing apparatus of claim 8, wherein the Hash index table is a Hash table; and
  the CPU is caused to perform operations of:
    performing the match operation between the identified operation type and at least one Hash table entry;
    processing the packet according to a processing mode comprised in a matched Hash table entry if the matched Hash table entry is found.

10. The packet processing apparatus of claim 8, wherein the Hash index table comprises a Hash table and a result table; and
  the CPU is caused to perform operations of:
    for each Hash table entry, finding a result table according to a result table pointer comprised in the Hash table entry; and
    performing the match operation between the identified operation type and result table entries in the found result table;
    processing the packet according to a processing mode comprised in a matched result table entry if the matched result table entry is found.

11. The packet processing apparatus of claim 8, wherein the Hash index table comprises a Hash table and a result table; and
  the CPU is caused to perform operations of:
    performing the match operation between the identified operation type and at least one Hash table entry;
    finding a result table according to a result table pointer comprised in a matched Hash table entry, if the matched result table entry is found;
    performing the match operation between the identified operation type and result table entries in the found result table;
    processing the packet according to a processing mode comprised in a matched result table entry if the matched result table entry is found.

12. The packet processing apparatus of claim 8, wherein the CPU is caused to perform operations of:

after performing a match operation between the identified operation type and the at least one Hash index table entry;

if no matched Hash index table entry is found, when determining it is needed to establish a Hash index table entry according to the packet, adding a Hash index table entry comprising the identified operation type into the Hash index table by taking the calculation result as the Hash entrance;

when determining it is needed to discard the packet, discarding the packet.

13. The packet processing apparatus of claim 8, wherein the CPU is caused to perform operations of:

when an interface is configured with at least one Access Control List (ACL) rule, dividing the at least one ACL rule into at least one ACL match service subclass according to preconfigured dividing rules; and configuring a corresponding relationship between the interface and the at least one ACL match service subclass in an interface table;

after receiving the packet, finding at least one ACL match service subclass corresponding to an ingress interface of the packet from the interface table; and determining an ACL match service subclass matching with the packet as the operation type of the operation to be performed for the packet from the at least one found ACL match service subclass.

14. The packet processing apparatus of claim 13, wherein the at least one ACL match service subclass comprises a Layer 2 ACL match service subclass, a Layer 3 Internet Protocol Version 4 (IPv4) ACL match service subclass and a Layer 3 Internet Protocol Version 6 (IPv6) ACL match service subclass; and wherein the CPU is caused to perform operations of:

if the packet is a Layer 2 packet, determining the ACL match service subclass matching with the packet as the Layer 2 ACL match service subclass;

if the packet is a Layer 3 packet and the packet is an IPv4 packet, determining the ACL match service subclass matching with the packet as the Layer 3 IPv4 ACL match service subclass; and if the packet is a Layer 3 packet and the packet is an IPv6 packet, determining the ACL match service subclass matching with the packet as the Layer 3 IPv6 ACL match service subclass.

\* \* \* \* \*